United States Patent
Budampati et al.

(10) Patent No.: US 8,498,201 B2
(45) Date of Patent: Jul. 30, 2013

(54) APPARATUS AND METHOD FOR IMPROVING THE RELIABILITY OF INDUSTRIAL WIRELESS NETWORKS THAT EXPERIENCE OUTAGES IN BACKBONE CONNECTIVITY

(75) Inventors: Ramakrishna S. Budampati, Maple Grove, MN (US); Soumitri N. Kolavennu, Blaine, MN (US); Arun V. Mahasenan, Trivandrum (IN)

(73) Assignee: Honeywell International Inc., Morristown, NJ (US)

( * ) Notice: Subject to any disclaimer, the term of this patent is extended or adjusted under 35 U.S.C. 154(b) by 446 days.

(21) Appl. No.: 12/869,557

(22) Filed: Aug. 26, 2010

(65) Prior Publication Data

US 2012/0051211 A1    Mar. 1, 2012

(51) Int. Cl.
*H04W 88/16* (2009.01)
(52) U.S. Cl.
USPC .......... 370/221; 370/218; 370/220; 370/277; 370/280; 455/343.5; 455/343.6; 455/344
(58) Field of Classification Search
USPC ............. 370/216–218, 221, 276, 277, 280; 455/343.2, 343.5, 343.6, 344
See application file for complete search history.

(56) References Cited

U.S. PATENT DOCUMENTS

| | | | |
|---|---|---|---|
| 4,679,189 A | 7/1987 | Olson et al. | |
| 5,537,414 A | 7/1996 | Takiyasu et al. | |
| 5,566,356 A | 10/1996 | Taketsugu | |
| 5,749,053 A | 5/1998 | Kusaki et al. | |
| 5,898,826 A | 4/1999 | Pierce et al. | |
| 6,192,232 B1 | 2/2001 | Iseyama | |
| 6,256,297 B1 | 7/2001 | Haferbeck et al. | |
| 6,427,071 B1 | 7/2002 | Adams et al. | |
| 6,437,692 B1 | 8/2002 | Petite et al. | |
| 6,631,416 B2 | 10/2003 | Bendinelli et al. | |

(Continued)

FOREIGN PATENT DOCUMENTS

| | | |
|---|---|---|
| DE | 103 14 721 A1 | 11/2004 |
| EP | 1 081 895 A1 | 3/2001 |

(Continued)

OTHER PUBLICATIONS

Salman Taherian, et al., "Event Dissemination in Mobile Wireless Sensor Networks", 2004 IEEE International Conference on Mobile Ad-Hoc and Sensor Systems, p. 573-575.

(Continued)

*Primary Examiner* — Un C Cho
*Assistant Examiner* — Siming Liu

(57) ABSTRACT

A method includes wirelessly receiving first data at a first backbone router and routing the first data from the first backbone router to a backbone network using a backbone connection of the first backbone router when the backbone connection is operational. The method also includes detecting a failure of the backbone connection after routing of the first data and automatically reconfiguring the first backbone router to function as a field router that does not route data using the backbone connection. The method further includes wirelessly receiving second data at the first backbone router and wirelessly routing the second data along an alternate path from the first backbone router to a second backbone router without using the backbone connection. The method could also include establishing the alternate path between the first backbone router and the second backbone router based on whether the first and second backbone routers are within wireless range.

20 Claims, 5 Drawing Sheets

U.S. PATENT DOCUMENTS

| | | | |
|---|---|---|---|
| 6,751,219 | B1 | 6/2004 | Lipp et al. |
| 6,847,316 | B1 | 1/2005 | Keller |
| 6,850,486 | B2 | 2/2005 | Saleh et al. |
| 6,917,584 | B2 | 7/2005 | Kuwabara |
| 7,031,308 | B2 | 4/2006 | Garcia-Luna-Aceves et al. |
| 7,035,937 | B2 | 4/2006 | Haas et al. |
| 7,190,961 | B2 | 3/2007 | Burr |
| 7,203,743 | B2 | 4/2007 | Shah-Heydari |
| 7,236,987 | B1 | 6/2007 | Faulkner et al. |
| 7,275,157 | B2 | 9/2007 | Cam Winget |
| 7,366,114 | B2 | 4/2008 | Park et al. |
| 7,440,735 | B2 | 10/2008 | Karschnia et al. |
| 7,460,865 | B2 | 12/2008 | Nixon et al. |
| 7,620,409 | B2 | 11/2009 | Budampati et al. |
| 7,688,802 | B2 | 3/2010 | Gonia et al. |
| 2002/0072329 | A1 | 6/2002 | Bandeira et al. |
| 2002/0120671 | A1 | 8/2002 | Daffner et al. |
| 2002/0122230 | A1 | 9/2002 | Izadpanah et al. |
| 2002/0176396 | A1 | 11/2002 | Hammel et al. |
| 2003/0003912 | A1 | 1/2003 | Melpignano et al. |
| 2003/0005149 | A1 | 1/2003 | Haas et al. |
| 2003/0076840 | A1* | 4/2003 | Rajagopal et al. ....... 370/395.21 |
| 2004/0010694 | A1 | 1/2004 | Collens et al. |
| 2004/0028023 | A1 | 2/2004 | Mandhyan et al. |
| 2004/0029553 | A1 | 2/2004 | Cain |
| 2004/0083833 | A1 | 5/2004 | Hitt et al. |
| 2004/0174829 | A1 | 9/2004 | Ayyagari |
| 2004/0230899 | A1 | 11/2004 | Pagnano et al. |
| 2004/0259533 | A1 | 12/2004 | Nixon et al. |
| 2005/0059379 | A1 | 3/2005 | Sovio et al. |
| 2005/0141553 | A1 | 6/2005 | Kim et al. |
| 2005/0201349 | A1 | 9/2005 | Budampati |
| 2005/0228509 | A1 | 10/2005 | James |
| 2005/0254653 | A1 | 11/2005 | Potashnik et al. |
| 2005/0281215 | A1 | 12/2005 | Budampati et al. |
| 2006/0002368 | A1 | 1/2006 | Budampati et al. |
| 2006/0039347 | A1 | 2/2006 | Nakamura et al. |
| 2006/0083200 | A1 | 4/2006 | Emeott et al. |
| 2006/0104301 | A1 | 5/2006 | Beyer et al. |
| 2006/0128349 | A1 | 6/2006 | Yoon |
| 2006/0171344 | A1 | 8/2006 | Subramanian et al. |
| 2006/0171346 | A1 | 8/2006 | Kolavennu et al. |
| 2006/0227729 | A1 | 10/2006 | Budampati et al. |
| 2006/0256740 | A1 | 11/2006 | Koski |
| 2006/0274644 | A1 | 12/2006 | Budampati et al. |
| 2006/0274671 | A1 | 12/2006 | Budampati et al. |
| 2006/0282498 | A1 | 12/2006 | Muro |
| 2006/0287001 | A1 | 12/2006 | Budampati et al. |
| 2007/0030816 | A1 | 2/2007 | Kolavennu |
| 2007/0030832 | A1 | 2/2007 | Gonia et al. |
| 2007/0067458 | A1 | 3/2007 | Chand |
| 2007/0073861 | A1 | 3/2007 | Amanuddin et al. |
| 2007/0076638 | A1 | 4/2007 | Kore et al. |
| 2007/0077941 | A1 | 4/2007 | Gonia et al. |
| 2007/0087763 | A1 | 4/2007 | Budampati et al. |
| 2007/0091824 | A1 | 4/2007 | Budampati et al. |
| 2007/0091825 | A1 | 4/2007 | Budampati et al. |
| 2007/0103303 | A1 | 5/2007 | Shoarinejad |
| 2007/0153677 | A1 | 7/2007 | McLaughlin et al. |
| 2007/0153789 | A1 | 7/2007 | Barker, Jr. et al. |
| 2007/0155423 | A1 | 7/2007 | Carmody et al. |
| 2007/0237137 | A1 | 10/2007 | McLaughlin |
| 2007/0280178 | A1 | 12/2007 | Hodson et al. |
| 2008/0043637 | A1 | 2/2008 | Rahman |
| 2008/0075109 | A1* | 3/2008 | Zangi ............................ 370/458 |
| 2008/0267259 | A1 | 10/2008 | Budampati et al. |
| 2008/0273547 | A1 | 11/2008 | Phinney |
| 2009/0010153 | A1* | 1/2009 | Filsfils et al. ................ 370/218 |
| 2009/0022121 | A1 | 1/2009 | Budampati et al. |
| 2009/0034441 | A1 | 2/2009 | Budampati et al. |
| 2009/0060192 | A1 | 3/2009 | Budampati et al. |
| 2009/0086692 | A1 | 4/2009 | Chen |
| 2009/0109889 | A1 | 4/2009 | Budampati et al. |
| 2009/0213730 | A1* | 8/2009 | Zeng et al. ................... 370/217 |

FOREIGN PATENT DOCUMENTS

| | | | |
|---|---|---|---|
| EP | 1 401 171 | A2 | 3/2004 |
| EP | 1 401 171 | A3 | 3/2004 |
| EP | 1 439 667 | A2 | 7/2004 |
| GB | 2 427 329 | A | 12/2006 |
| WO | WO 01/35190 | A2 | 5/2001 |
| WO | WO 01/35190 | A3 | 5/2001 |
| WO | WO 03/079616 | A1 | 9/2003 |
| WO | WO 2004/047385 | A2 | 6/2004 |
| WO | WO 2004/047385 | A3 | 6/2004 |
| WO | WO 2006/017994 | A1 | 2/2006 |
| WO | WO 2006/053041 | A1 | 5/2006 |

OTHER PUBLICATIONS

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Dr. Soumitri Kolavennu, Presentation, "WNSIA MAC Layer", ISA SP100 meeting, Feb. 14, 2007, 24 pages, see esp. p. 17.

Ying Zhang, et al., "A Learning-based Adaptive Routing Tree for Wireless Sensor Networks", Journal of Communications, vol. 1, No. 2, May 2006, p. 12-21.

Yau-Ming Sun, et al., "An Efficient Deadlock-Free Tree-Based Routing Algorithm for Irregular Wormhole-Routed Networks Based on the Turn Model", Proceedings of the 2004 International Conference on Parallel Processing (ICPP'04), 10 pages.

Sejun Song, "Fault Recovery Port-based Fast Spanning Tree Algorithm (FRP-FAST) for the Fault-Tolerant Ethernet on the Arbitrary Switched Network Topology", 2001 IEEE, p. 325-332.

"XYR 5000 Wireless Transmitters, Honeywell Solutions for Wireless Data Acquisiton and Monitoring," www.acs.honeywell.com, Feb. 2006, 6 pages.

Christopher Pulini, et al. "Gateway Supporting Transparent Redundancy in Process Control Systems and Other Systems and Related Method", U.S. Appl. No. 12/762,215, filed Apr. 16, 2010.

A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.

International Search Report and Written Opinion of the International Searching Authority in PCT Application No. PCT/US2007/069717 dated Dec. 10, 2007.

International Search Report and Written Opinion of the International Searching Authority in PCT Application No. PCT/US2007/069614 dated Nov. 22, 2007.

International Search Report and Written Opinion of the International Searching Authority in PCT Application No. PCT/US2007/069710 dated Nov. 27, 2007.

International Search Report and Written Opinion of the International Searching Authority in PCT Application No. PCT/US2007/069705 dated Apr. 15, 2008.

Pereira, J.M. Dias, "A Fieldbus Prototype for Educational Purposes", IEEE Instrumentation & Measurement Magazine, New York, NY vol. 7, No. 1, Mar. 2004, p. 24-31.

International Search Report and Written Opinion of the International Searching Authority in PCT Application No. PCT/US2006/048334 dated Jul. 5, 2007.

European Search Report dated Oct. 6, 2008 in connection with European Patent Application No. 08 16 1387.

* cited by examiner

APPARATUS AND METHOD FOR IMPROVING THE RELIABILITY OF INDUSTRIAL WIRELESS NETWORKS THAT EXPERIENCE OUTAGES IN BACKBONE CONNECTIVITY

TECHNICAL FIELD

This disclosure relates generally to industrial control and automation systems. More specifically, this disclosure relates to an apparatus and method for improving the reliability of industrial wireless networks that experience outages in backbone connectivity.

BACKGROUND

Industrial control and automation systems routinely include wireless networks that facilitate communications with a wide range of field devices (such as wireless sensors and wireless actuators). For example, the ISA100.11a standard specifies how wireless routers can form a mesh network to provide wireless service for field devices. The mesh network routes data back and forth between the field devices and a backbone network, which is often connected to a plant network through one or more gateways. The backbone network typically includes backbone routers, each of which can route data between multiple field devices and destinations on the backbone network.

SUMMARY

This disclosure provides an apparatus and method for improving the reliability of industrial wireless networks that experience outages in backbone connectivity.

In a first embodiment, a method includes wirelessly receiving first data at a first backbone router in a wireless network and routing the first data from the first backbone router to a backbone network using a backbone connection of the first backbone router when the backbone connection is operational. The method also includes detecting a failure of the backbone connection after routing of the first data and automatically reconfiguring the first backbone router to function as a field router that does not route data using the backbone connection. The method further includes wirelessly receiving second data at the first backbone router and wirelessly routing the second data along an alternate path from the first backbone router to a second backbone router without using the backbone connection.

In a second embodiment, an apparatus includes at least one wireless transceiver configured to communicate over a wireless network. The apparatus also includes at least one network interface configured to communicate over a backbone connection. In addition, the apparatus includes a controller configured to, when the backbone connection is operational, route first data over the backbone connection using the at least one network interface. The controller is also configured to, when the backbone connection is non-operational, (i) automatically reconfigure the apparatus to function as a field router that does not route data using the backbone connection and (ii) wirelessly route second data along an alternate path to a backbone router with an alternate backbone connection using the at least one wireless transceiver. The first and second data are received wirelessly by the at least one wireless transceiver.

In a third embodiment, a computer readable medium embodies a computer program. The computer program includes computer readable program code for receiving first data transmitted wirelessly to a first backbone router in a wireless network and routing the first data from the first backbone router to a backbone network using a backbone connection of the first backbone router when the backbone connection is operational. The computer program also includes computer readable program code for detecting a failure of the backbone connection after routing of the first data and automatically reconfiguring the first backbone router to function as a field router that does not route data using the backbone connection. The computer program further includes computer readable program code for receiving second data transmitted wirelessly to the first backbone router and wirelessly routing the second data along an alternate path from the first backbone router to a second backbone router without using the backbone connection.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
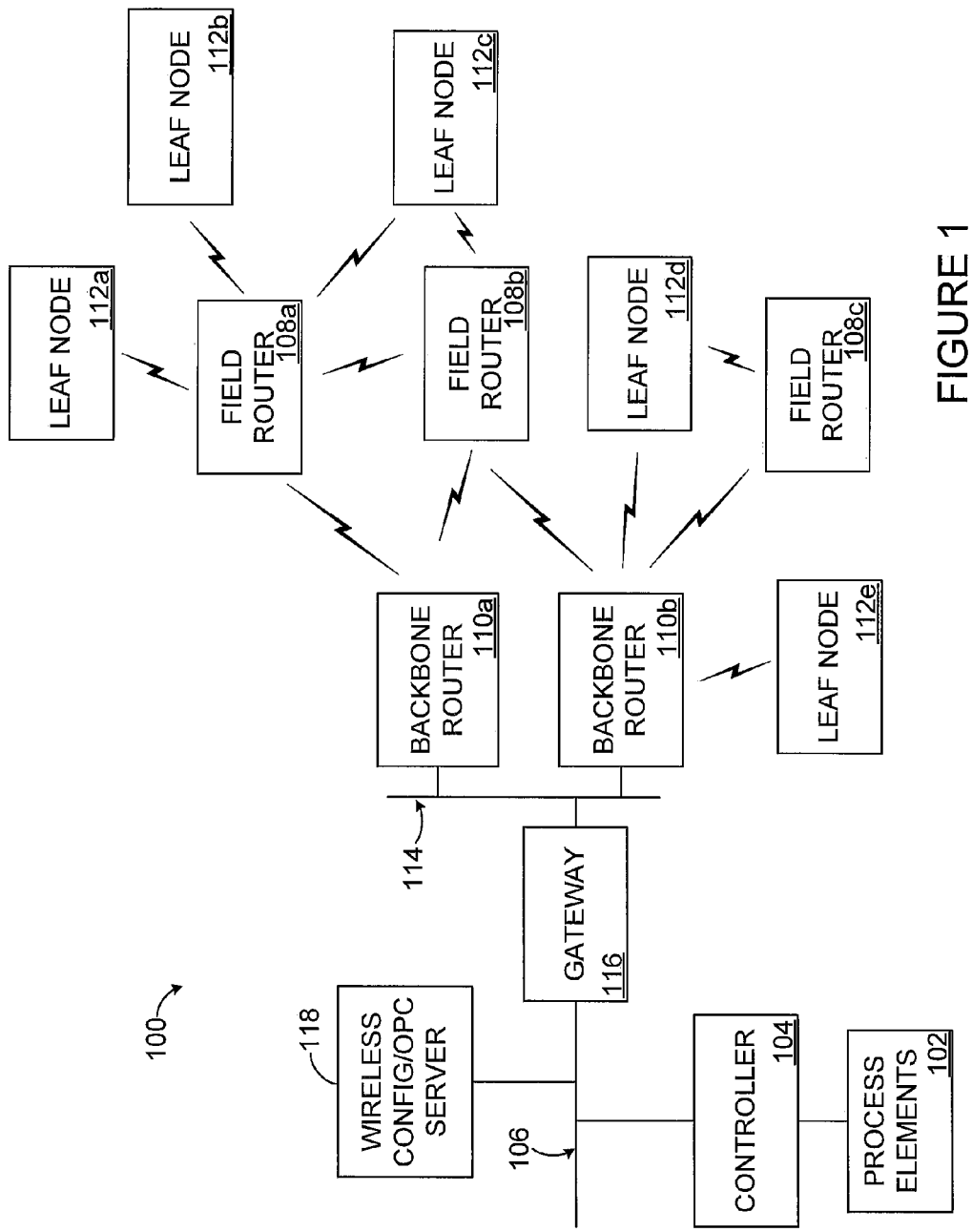
FIG. 1 illustrates an example industrial control and automation system according to this disclosure.

FIG. 1 illustrates an example industrial control and automation system 100 according to this disclosure. In this example embodiment, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102 such as actuators, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS or suitable real-time operating system.

A plant network 106 facilitates communication between various components in the system 100, such as components in at least one processing plant or other facility. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

In FIG. 1, the system 100 also includes one or more wireless networks. In this example, a wireless network includes field routers 108a-108c and backbone routers 110a-110b. The field routers 108a-108c and backbone routers 110a-110b wirelessly communicate with each other to form a mesh network. For example, the field routers 108a-108c receive data transmitted wirelessly from leaf nodes 112a-112d and route the data to the backbone routers 110a-110b. The backbone routers 110a-110b receive data from the field routers 108a-108c directly or indirectly (such as through other field routers) and directly or indirectly from leaf nodes 112d-112e for transmission over a backbone network 114. The field routers 108a-108c and backbone routers 110a-110b also route data received over the backbone network 114 to the leaf nodes 112a-112e. In this way, the field routers 108a-108c and backbone routers 110a-110b form a mesh network that can provide wireless coverage to leaf nodes and other devices in a specified area, such as a large industrial complex.

In this example, the field routers 108a-108c and backbone routers 110a-110b generally represent routing devices that store and forward messages for other devices and that are typically line-powered, meaning these devices receive operating power from external sources. However, a field or backbone router could represent a device powered by a local power supply, such as an internal battery (referred to as locally-powered). The leaf nodes 112a-112e generally represent non-routing devices that are routinely locally-powered, although a leaf node could provide routing functionality or be line-powered.

Each field router 108a-108c and backbone router 110a-110b includes any suitable structure facilitating wireless communications, such as a radio frequency (RF) frequency-hopping spread spectrum (FHSS) or direct sequence spread spectrum (DSSS) transceiver. Each of the backbone routers 110a-110b also includes any suitable structure facilitating communication over the backbone network 114, such as an Ethernet transceiver. The backbone network 114 includes any suitable network for transporting data, such as a FAULT TOLERANT ETHERNET network, a wireless mesh network, or other wired or wireless network.

A gateway 116 couples the plant network 106 and the backbone network 114. The gateway 116 can perform security functions to allow only authorized traffic to flow between the networks 106 and 114. The gateway 116 can also perform translation functions to translate between an industrial wireless network protocol (such as ISA100.11a) and the plant network protocol. The gateway 116 includes any suitable structure for providing access to networks and translating between protocols used by those networks.

A wireless configuration and OLE for Process Control (OPC) server 118 can configure and control various aspects of the system 100. For example, the server 118 could configure the operation of the field routers 108a-108c, backbone routers 110a-110b, and leaf nodes 112a-112e. The server 118 could also support security in the system 100, such as by distributing cryptographic keys or other security data to various wireless devices or other components. The server 118 includes any hardware, software, firmware, or combination thereof for configuring wireless networks and providing security information.

In particular embodiments, various devices in the wireless network of FIG. 1 form a mesh network communicating at 2.4 GHz or 5.8 GHz. Also, in particular embodiments, data can be injected into the wireless mesh network through the routers or leaf nodes, thus providing versatile, multifunctional, plant-wide coverage for wireless sensing, asset location tracking, personnel tracking, wireless communications, and any other or additional functionality as desired.

In one aspect of operation, each backbone router 110a-110b can support multiple field devices, meaning each backbone router can route data back and forth between those field devices and destinations on the backbone network 114. If the backbone connection of a backbone router 110a-110b goes down, communications with all of the field devices served by that backbone router might be interrupted. The system 100 therefore supports a mechanism to maintain the reliability of the wireless network and maintain these communications even if a backbone connection goes down temporarily or permanently. Such an outage may occur at any backbone router 110a-110b. The system 100 does this by allowing reconfiguration of each backbone router 110a-110b.

As described in more detail below, when a backbone router 110a-110b loses its backbone connection, that backbone router may be reconfigured as a field router. The reconfigured backbone router could then forward any data it would normally send over the backbone network 114 to another backbone router, either directly or indirectly through other field routers. If, for example, the backbone router 110a loses its backbone connection, the backbone router 110a reconfigures itself as a field router. When the backbone router 110a receives data it would normally send over the backbone network 114, the backbone router 110a can transmit that data to the backbone router 110b either directly or indirectly via the field router 108b.

In this way, communications can still occur between a backbone router with a failed backbone connection and the field routers and field devices (such as leaf nodes) that ordinarily communicate with that backbone router. The reconfiguration of a backbone router into a field router can be substantially or completely transparent to field routers and leaf nodes that communicate with that backbone router. This provides improved reliability of the wireless network. This can also help to reduce or eliminate the immediate network turbulence that a loss of a backbone connection might otherwise cause. Moreover, this can be done without requiring one backbone router to function as a backup of the other backbone router, meaning the backbone routers do not need to exchange data so that one backbone router can take over if the other backbone router fails. Rather, the backbone router with the functional backbone connection may simply operate normally, routing data as it is received wirelessly.

In some embodiments, the alternate communication path to be used by a backbone router 110a-110b when its backbone connection fails can be static and established at an earlier time. For example, a human operator or an automated system manager could assign each backbone router 110a-110b with an alternate route to be used when that backbone router loses its backbone connection. This could be done when each backbone router 110a-110b first joins the wireless network. Of course, other static selections or any dynamic selections of alternate routes could be used.

In this document, a backbone connection may be said to be "operational" when communication with an intended destination on the backbone network 114 can occur successfully. A backbone connection may be said to be "non-operational" or "failed" when communication with an intended destination on the backbone network 114 cannot occur successfully. A backbone connection may be non-operational or failed even when a backbone router itself is completely functional and one or more cables forming the backbone connection from the backbone router to the backbone network 114 are working correctly. For example, a failure of a gateway or a failure of a portion of the backbone network 114 itself could cut off a backbone router from an intended destination, in which case the backbone connection is said to have failed.

Although FIG. 1 illustrates one example of an industrial control and automation system 100, various changes may be made to FIG. 1. For example, the system 100 could include any number of process elements, controllers, networks (wired or wireless), routers (field or backbone), leaf nodes, and servers. Also, the functional division shown in FIG. 1 is for illustration only. Various components in FIG. 1 could be combined, subdivided, or omitted and additional components could be added according to particular needs. Further, while the wireless network is illustrated as being used along with a wired controller 104 and wired process elements 102, one or more wireless networks could be used in a system without wired control elements. In addition, FIG. 1 illustrates one example operational environment where reconfiguration of a backbone router to compensate for a loss of backbone connectivity can be used. This functionality could be used in any other suitable system.

Figure 2:
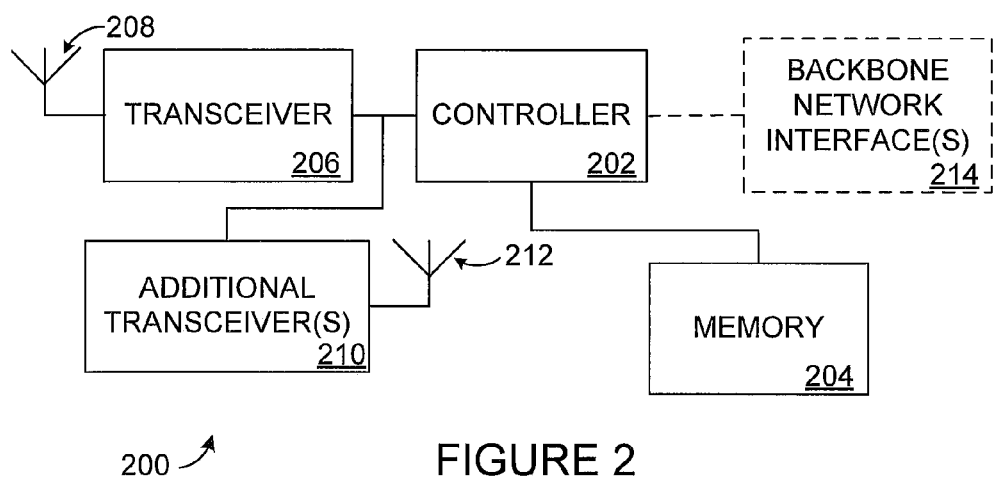
FIG. 2 illustrates an example wireless router in an industrial control and automation system according to this disclosure.

FIG. 2 illustrates an example wireless router 200 in an industrial control and automation system according to this disclosure. The wireless router 200 could, for example, represent a field router 108a-108c or a backbone router 110a-110b in the system 100 of FIG. 1.

As shown in FIG. 2, the router 200 includes a controller 202, which controls the overall operation of the router 200. For example, the controller 202 may receive or generate data to be transmitted, and the controller 202 could provide the data to other component(s) in the router 200 for transmission over a wired or wireless network. The controller 202 could also receive data over a wired or wireless network and use or forward the data. As a particular example, the controller 202 in a field router or backbone router could receive data transmitted wirelessly, determine a next hop for the data (if any), and provide the data for transmission to the next hop (if any). As another example, the controller 202 in a backbone router could receive data from a wired network and provide the data for transmission in a wireless network (or vice versa). The controller 202 includes any hardware, software, firmware, or combination thereof for controlling operation of a wireless device. As particular examples, the controller 202 could represent a processor, microprocessor, microcontroller, field programmable gate array, digital signal processor, or other processing or control device.

A memory 204 is coupled to the controller 202. The memory 204 stores any of a wide variety of information used, collected, or generated by the router 200. For example, the memory 204 could store information received over a network that is to be transmitted over the same or other network. In a backbone router, the memory 204 could also store information identifying an alternate wireless communication path to be used if and when the backbone router's backbone connection fails. The memory 204 includes any suitable volatile and/or non-volatile storage and retrieval device(s).

The router 200 also includes one or more wireless transceivers 206 coupled to one or more antennas 208. In a field or backbone router, the transceiver(s) 206 and antenna(s) 208 can be used to communicate wirelessly with one or more leaf nodes. One or more additional transceivers 210 can be used to communicate with other field or backbone routers. The additional transceiver(s) 210 may be coupled to one or more antennas 212 or share one or more common antennas (such as antenna(s) 208). Each transceiver includes any suitable structure for providing signals for wireless transmission and/or for obtaining signals received wirelessly. Each antenna represents any suitable structure for transmitting and/or receiving wireless signals. In some embodiments, each transceiver represents an RF transceiver, such as an RF FHSS or DSSS transceiver. Also, each antenna could represent an RF antenna. Note that any other suitable wireless signals could be used to communicate and that each transceiver could include a transmitter and a separate receiver.

If the router 200 represents a backbone router, the router 200 further includes one or more backbone network interfaces 214. The backbone network interfaces 214 allow the router 200 to communicate over one or more backbone networks 114. Each backbone network interface 214 includes any suitable structure for transmitting and/or receiving signals over a backbone network, such as an Ethernet interface or a wireless transceiver.

Although FIG. 2 illustrates one example of a wireless router 200 in an industrial control and automation system, various changes may be made to FIG. 2. For example, various components in FIG. 2 could be combined, subdivided, or omitted and additional components could be added according to particular needs. Also, a "wireless device" or "wireless router" represents any device or router that can transmit and/or receive data wirelessly, even if the device or router has the ability to transmit and/or receive data over a wired connection as well.

Figure 3:
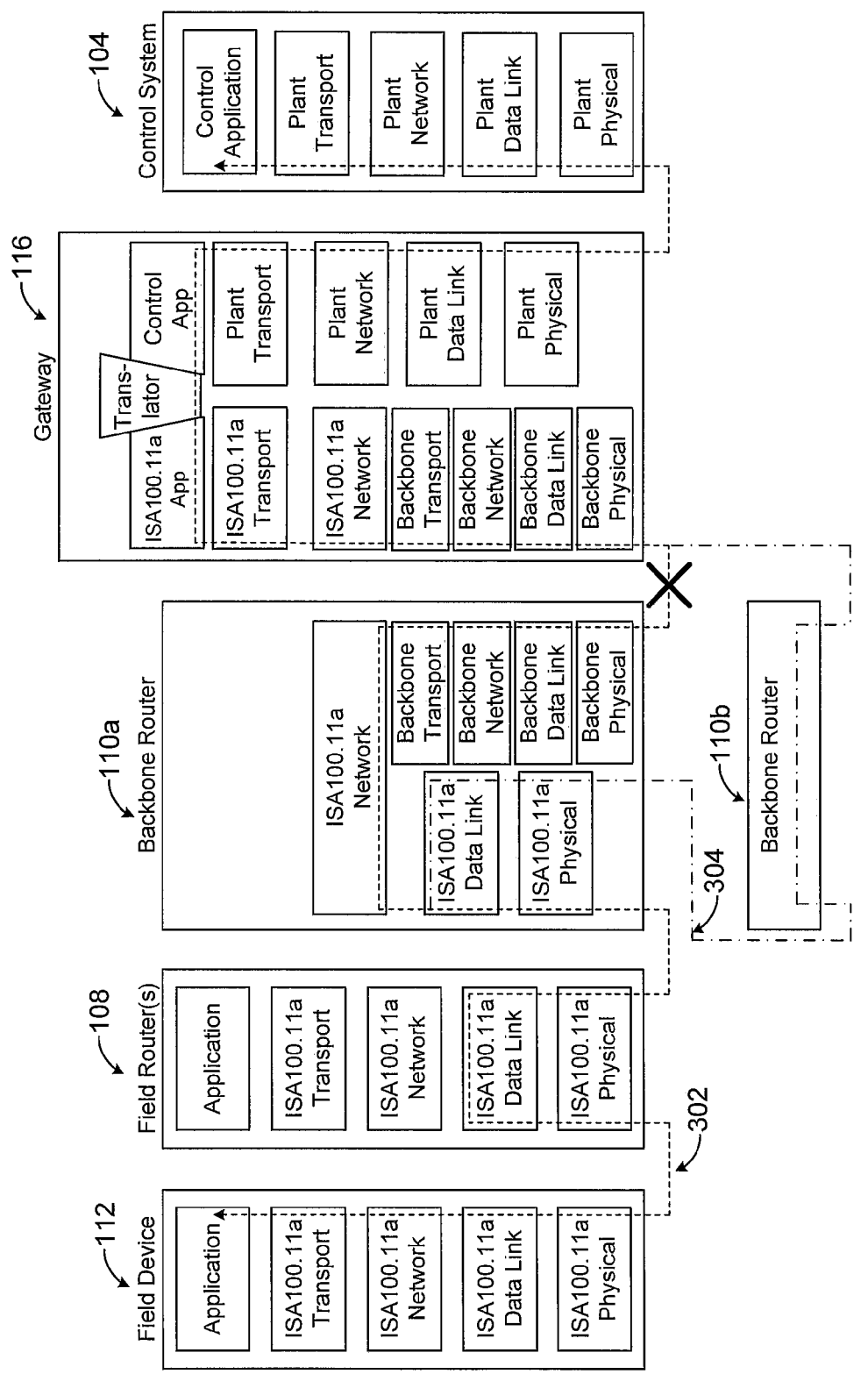
FIG. 3 illustrates example protocol stacks and routing of data in various devices within an industrial control and automation system according to this disclosure.

FIG. 3 illustrates example protocol stacks and routing of data in various devices within an industrial control and automation system according to this disclosure. As shown in FIG. 3, a field device 112 (such as a leaf node 112a-112e) includes an ISA100.11a physical layer, data link layer, network layer, and transport layer. The ISA100.11a layers support wireless communications using the ISA100.11a protocol. The field device 112 also includes an application layer. Each field router 108 may contain similar layers.

Each backbone router 110a-110b includes an ISA100.11a physical layer, data link layer, and network layer. Each backbone router 110a-110b also includes a backbone network transport layer, network layer, data link layer, and physical layer. The backbone layers support communications over the backbone network 114 using the backbone network's protocol.

Each gateway 116 includes a backbone network physical layer, data link layer, network layer, and transport layer. Each gateway 116 also includes an ISA100.11a network layer, transport layer, and application layer. These layers support the communication of ISA100.11a data over the backbone network 114. Each gateway 116 further includes a plant network physical layer, data link layer, network layer, and transport layer. The plant network layers support communications over the plant network 106 using the plant network's protocol. A control application layer sits above the plant network transport layer and supports various industrial process control functions. In addition, each gateway 116 includes a translator, which translates between the industrial wireless protocol (in this case ISA100.11a) and the plant network protocol. A control system component (such as the controller) 104 includes a plant network physical layer, data link layer, network layer, and transport layer, as well as a control application layer that sits above the plant network transport layer. The various layers shown here could be compliant with the Open Systems Interconnection (OSI) model.

In this example, the dashed path 302 represents the normal path for exchanging data between the field device 112 and the control system component 104. The path 302 includes all of the illustrated layers in the field device 112, the backbone router 110a, the gateway 116, and the control system component 104, as well as the lower two illustrated layers in the field router 108. During normal operation when the backbone connection of the backbone router 110a is functional, the backbone router 110a uses its own internal routing table at the ISA100.11a network layer to determine whether to use the backbone transport layer or the ISA100.11a data link layer for sending out data that needs to reach a particular destination. Thus, when data from the field device 112 is received, the backbone router 110a could route that data to the backbone network 114.

As shown in FIG. 3, when the backbone router 110a loses its backbone connection, the backbone router 110a is no longer able to provide data from the field device 112 to the gateway 116. This could be problematic, particularly if the control system component 104 needs to communicate with the field device 112 in order to effectively control an industrial process. When the backbone router 110a detects the loss of its backbone connection, the backbone router 110a reconfigures itself as a field router. In this case, communications through the backbone router 110a follow the path 304, where the path 304 includes the lower two illustrated ISA100.11a layers of the backbone router 110a. The path 304 from the backbone router 110a goes through the backbone router 110b (possibly through one or more intervening field routers), and the backbone router 110b provides connectivity to the gateway 116 and therefore to the control system component 104.

Figure 4A:
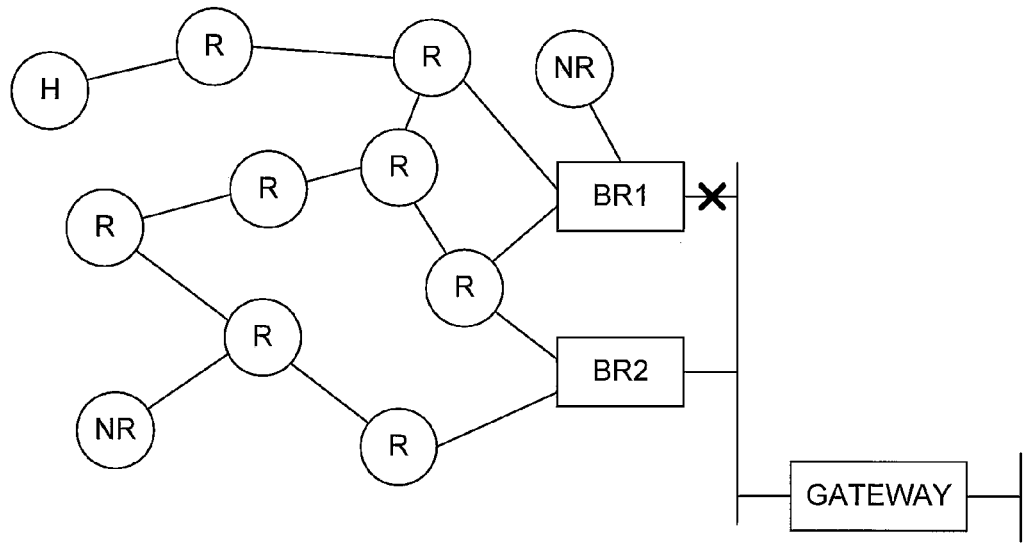
FIGS. 4A and 4B illustrate an example reconfiguration of a backbone router to compensate for a loss of backbone connectivity according to this disclosure.
Figure 4B:
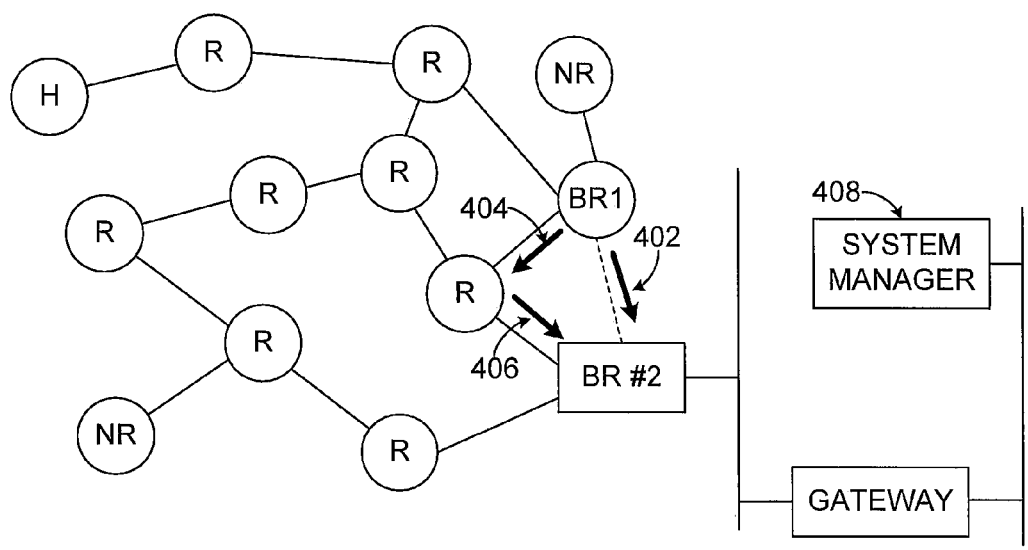

FIGS. 4A and 4B illustrate an example reconfiguration of a backbone router to compensate for a loss of backbone connectivity according to this disclosure. In FIG. 4A, a wireless network includes various field routers R, non-routing devices NR (such as non-routing leaf nodes), and portable handheld devices H. The wireless network also includes two backbone routers BR1 and BR2, which are coupled to a gateway. As shown in FIG. 4A, the backbone router BR1 loses its backbone connection. When this occurs, the backbone router BR1 reconfigures itself into a field router as shown in FIG. 4B. In this configuration, the backbone router BR1 forwards data to the backbone router BR2 directly along a path 402 or indirectly, such as along paths 404-406 through one or more field routers.

In some embodiments, only the backbone router BR1 may take immediate action in response to the loss of its backbone connection. None of the other devices (including a system manager 408) may need to take any immediate action to recover. This is because the reconfiguration of the backbone router BR1 into a field router may reduce or eliminate the loss of any information being transmitted through the backbone router BR1. The backbone router BR1 could inform the system manager 408 of the loss of its backbone connection, either immediately or at some later time. The system manager 408 may then decide to make necessary adjustments to the wireless network, although this need not be performed immediately.

As noted above, the establishment of an alternate path from a first backbone router to a second backbone router can be done when the first backbone router joins a wireless network. The establishment of the alternate path could differ depending on whether the first backbone router can communicate directly with the second backbone router.

In some embodiments, when the first backbone router is within wireless range of and can communicate directly with the second backbone router, the establishment of the alternate path could occur as follows. The system manager 408 can ensure that the first backbone router assigns the second backbone router as one of its data link layer neighbors. Both backbone routers are assigned CCQ transmit and receive links (or some other contention-based links such as carrier sense multiple access links) that occur in certain time slots. When the first backbone router detects that its backbone connection has failed, it can send data to the second backbone router using these transmit and receive links since the second backbone router is listening on these links. In these embodiments, the first backbone router can use source routing at the data link layer for the data sent to the second backbone router. No other device in the wireless network may have to take any action since the second backbone router forwards the received data as per the source route in the data link layer header of the data. The first backbone router can inform the system manager 408 about its lost backbone connection via the second backbone router.

In some embodiments, when the first backbone router cannot communicate directly with the second backbone router, the system manager 408 can assign one or more neighboring field routers to act as a bridge between the first and second backbone routers. If a neighboring field router is line-powered, the first and second backbone routers and the neighboring field router are assigned CCQ transmit and receive links (or other contention-based links) that occur in certain time slots. If a neighboring field router is internally powered, the system manager 408 can make sure that there is at least one CCQ link for sending data from the first backbone router to the neighboring field router (such as a Guaranteed Leaf Access or "GLA" transmit link in a ONEWIRELESS network from HONEYWELL INTERNATIONAL INC.). The system manager 408 can also make sure that there is at least one CCQ link for sending data from the neighboring field router to the second backbone router (such as a dedicated CCQ transmit link in a ONEWIRELESS network). When the first backbone router detects that its backbone connection has failed, it can send data to the neighboring field router using at least one CCQ link since the neighboring field router is listening on the link(s). The first backbone router can use source routing at the data link layer for this data. As the source route is included in the data, the neighboring field router can examine the source route (which points to the second backbone router as the next hop), and the field router forwards the data to the second backbone router. No other device in the network has to take any action. The neighboring field router and the second backbone router forward the received data as per the source route in the header of the data. Again, the first backbone router can inform the system manager 408 about its lost backbone connection via the second backbone router.

Note that these techniques for assigning communication links are for illustration only. Other techniques could be used to assign communication links between neighboring backbone routers or between backbone routers and neighboring field routers. Also note that the system manager 408 could periodically or at other times test the alternate connections between backbone routers. If necessary, the connections between backbone routers can be updated based on the tests. This can help to ensure that the alternate connections between backbone routers are valid when they are needed. In addition, note that a backbone router that has configured itself as a field router can then reconfigure itself as a backbone router if and when its backbone connection is restored.

As network connectivity between field devices and backbone devices can be substantially or completely maintained throughout this process, there may be little or no loss of communication between those devices, and all of their on-going conversations can be maintained. However, there may be degradation in the quality of service (QoS) for certain conversations. This is because the communication path that previously went through the first backbone router into the backbone network now goes from the first backbone router to the second backbone router (and possibly through one or more intervening field routers). This adds one or more data link layer hops to the communication path. The system manager 408 may decide to restore the QoS for one or more of these conversations, or the affected devices may ask the system manager 408 to do so. In either case, the system manager 408 can reconfigure the affected devices to use more optimal communication paths so as to restore their QoS. Even if there are no QoS issues, the system manager 408 may decide to reconfigure some of the communication paths for various reasons, such as load balancing or optimizing battery life of certain field devices.

Note that this scheme can handle backbone outages at more than one location in the network. Assuming there are n backbone routers, up to n–1 backbone routers may lose their backbone connections, and communications through those backbone routers may continue as long as there is a data link layer path from those backbone routers to the backbone router with a functioning backbone connection. Each backbone router can perform the process described above to maintain network connectivity using its data link layer to reach another backbone router.

Although FIG. 3 illustrates examples of protocol stacks and routing of data in various devices within an industrial control and automation system, various changes may be made to FIG. 3. For example, while the use of ISA100.11a is shown, other wireless communication protocols could be used in the industrial wireless network. Also, the various devices shown in FIG. 3 could have any other or additional protocol layers. In addition, the paths 302-304 shown in FIG. 3 could be different, such as when the backbone router 112b communicates with the control system component 104 through its own gateway (instead of the same gateway with which the backbone router 112a communicates). Although FIGS. 4A and 4B illustrate one example of a reconfiguration of a backbone router to compensate for a loss of backbone connectivity, various changes may be made to FIGS. 4A and 4B. For instance, the makeup and arrangement of the wireless network shown in FIGS. 4A and 4B are for illustration only. Also, the backbone routers BR1 and BR2 could communicate indirectly through more than one field router.

Figure 5:
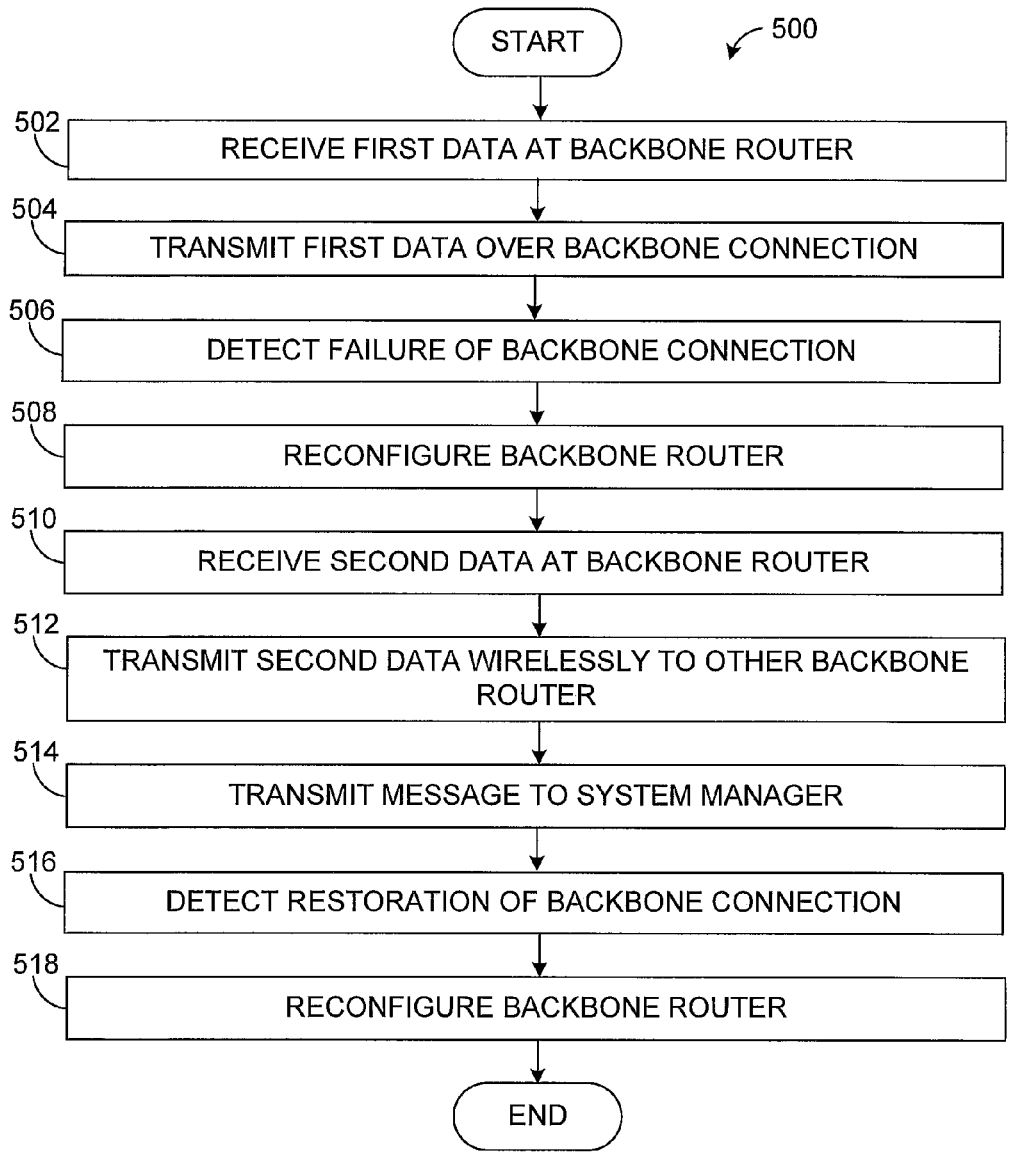
FIG. 5 illustrates an example method for handling a loss of backbone connectivity at a backbone router according to this disclosure.

FIG. 5 illustrates an example method 500 for handling a loss of backbone connectivity at a backbone router according to this disclosure. As shown in FIG. 5, first data is received at a backbone router at step 502, and the first data is transmitted over a backbone connection at step 504. This could include, for example, the backbone router 110a receiving data from one or more field routers or leaf nodes and transmitting the data over the backbone network 114.

A failure of the backbone connection is identified at step 506. The backbone connection failure could be due to a number of reasons, such as a fault in the network interface 214 of the backbone router 110a or a cut cable in the backbone network 114. The failure of the backbone connection could be detected in any suitable manner, such as by failing to receive expected messages over the backbone connection. The backbone router is reconfigured at step 508. This could include, for example, the controller 202 in the backbone router 110a reconfiguring the backbone router 110a to function as a field router. In particular embodiments, the controller 202 can cause the backbone router 110a to route incoming data back out through its ISA100.11a protocol layers instead of through its backbone network protocol layers.

Second data is received at the backbone router at step 510, and the second data is transmitted to another backbone router at step 512. This could include, for example, the backbone router 110a receiving data from one or more field routers or leaf nodes and transmitting the data to the backbone router 110b. The data can be sent to the backbone router 110b directly or via one or more intermediate field routers. The backbone router with the failed backbone connection also sends a message to a system manager at step 514. This could include, for example, the backbone router 110a sending the message to the system manager via the backbone router 110b. This allows the backbone router 110a to notify the system manager of its failed backbone connection problem, which allows the system manager to notify appropriate personnel and take any necessary or desired actions to reconfigure the wireless network in view of the fault. The system manager could also cause the backbone router(s) 110a-110b to adjust one or more QoS parameters, communication paths, or other parameters for the existing communications in the wireless network.

If and when the backbone router detects that its backbone connection has been restored at step 516, the backbone router is reconfigured at step 518. This could include, for example, the controller 202 in the backbone router 110a reconfiguring the backbone router 110a to function as a backbone router. In particular embodiments, the controller 202 can cause the backbone router 110a to route incoming data through its backbone network protocol layers to the backbone network 114.

Although FIG. 5 illustrates one example of a method 500 for handling a loss of backbone connectivity at a backbone router, various changes may be made to FIG. 5. For example, while FIG. 5 illustrates a series of steps, various steps in each figure could overlap, occur in parallel, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   wirelessly receiving first data at a first backbone router in a wireless network;
   routing the first data from the first backbone router to a backbone network using a backbone connection of the first backbone router when the backbone connection is operational;
   detecting a failure of the backbone connection after routing of the first data;
   automatically reconfiguring the first backbone router to function as a field router that does not route data using the backbone connection;
   establishing an alternate path between the first backbone router and a second backbone router, the alternate path based on whether the first backbone router is within wireless range of the second backbone router;
   wirelessly receiving second data at the first backbone router; and
   wirelessly routing the second data along the alternate path from the first backbone router to the second backbone router without using the backbone connection;
   wherein establishing the alternate path comprises, when the first backbone router is not within wireless range of the second backbone router:
      if a neighboring field router within wireless range of the first backbone router is line powered, assigning to the first backbone router a first transmit link and a receive link that occur in specified time slots, the first transmit link and the receive link known to the neighboring field router; and
      if the neighboring field router within wireless range of the first backbone router is locally powered, assigning a second transmit link to the first backbone router, the second transmit link known to the neighboring field router; and
   wherein the second data is wirelessly routed to the neighboring field router using one of the first and second transmit links for delivery to the second backbone router.

2. The method of claim 1, wherein establishing the alternate path further comprises, when the first backbone router is within wireless range of the second backbone router:
   assigning the second backbone router as a data link layer neighbor of the first backbone router; and
   assigning to the first backbone router a third transmit link and a second receive link that occur in specified time slots, the third transmit link and the second receive link known to the second backbone router.

3. The method of claim 1, wherein wirelessly routing the second data along the alternate path comprises:
   using source routing at a data link layer of the first backbone router such that a source route is included in the second data routed over the alternate path from the first backbone router.

4. The method of claim 1, further comprising:
   transmitting a message identifying the failed backbone connection from the first backbone router over the alternate path.

5. The method of claim 1, further comprising:
   detecting restoration of the backbone connection; and
   reconfiguring the first backbone router to route additional data to the backbone network over the restored backbone connection.

6. The method of claim 1, wherein:
   the first backbone router comprises a wireless physical layer, data link layer, and network layer and a backbone physical layer, data link layer, network layer, and transport layer;
   routing the first data from the first backbone router to the backbone network comprises routing the first data from the wireless network layer through the backbone transport, network, data link, and physical layers; and
   automatically reconfiguring the first backbone router and wirelessly routing the second data along the alternate path comprise causing the first backbone router to route the second data through the wireless data link and physical layers for wireless transmission over the alternate path.

7. The method of claim 1, further comprising:
   adjusting at least one of a quality of service parameter and a communication path in the wireless network at the first backbone router after the first backbone router has been reconfigured as the field router.

8. An apparatus comprising:
   at least one wireless transceiver configured to communicate over a wireless network;
   at least one network interface configured to communicate over a backbone connection; and
   a controller configured to:
      when the backbone connection is operational, route first data over the backbone connection using the at least one network interface, the first data received wirelessly by the at least one wireless transceiver; and
      when the backbone connection is non-operational, (i) automatically reconfigure the apparatus to function as a field router that does not route data using the backbone connection, (ii) establish an alternate path to a backbone router with an alternate backbone connection, and (iii) wirelessly route second data along the alternate path to the backbone router with the alternate backbone connection using the at least one wireless transceiver, the second data received wirelessly by the at least one wireless transceiver, the alternate path based on whether the apparatus is within wireless range of the backbone router;
   wherein, when the apparatus is not within wireless range of the backbone router, the controller is configured to establish the alternate path by:
      if a neighboring field router within wireless range of the apparatus is line powered, assigning to the apparatus a first transmit link and a receive link that occur in specified time slots, the first transmit link and the receive link known to the neighboring field router; and if the neighboring field router within wireless range of the apparatus is locally powered, assigning a second transmit link to the apparatus, the second transmit link known to the neighboring field router; and wherein the apparatus is configured to wirelessly route the second data to the neighboring field router using one of the first and second transmit links for delivery to the backbone router.

9. The apparatus of claim 8, wherein, when the apparatus is within wireless range of the backbone router, the controller is configured to establish the alternate path by:

assigning the backbone router as a data link layer neighbor of the apparatus; and assigning to the apparatus a third transmit link and a second receive link that occur in specified time slots, the third transmit link and the second receive link known to the backbone router.

10. The apparatus of claim 8, wherein the controller is configured to wirelessly route the second data along the alternate path using source routing at a data link layer such that a source route is included in the second data routed over the alternate path.

11. The apparatus of claim 8, wherein the controller is further configured to transmit a message identifying the failed backbone connection over the alternate path.

12. The apparatus of claim 8, wherein the controller is further configured to:

detect restoration of the backbone connection; and reconfigure the apparatus to route additional data over the restored backbone connection.

13. The apparatus of claim 8, wherein:

the apparatus comprises a wireless physical layer, data link layer, and network layer and a backbone physical layer, data link layer, network layer, and transport layer;

the controller is configured to route the first data over the backbone connection by routing the first data from the wireless network layer through the backbone transport, network, data link, and physical layers; and the controller is configured to wirelessly route the second data along the alternate path by routing the second data through the wireless data link and physical layers for wireless transmission over the alternate path.

14. A non-transitory computer readable medium embodying a computer program, the computer program comprising computer readable program code for:

receiving first data transmitted wirelessly to a first backbone router in a wireless network;

routing the first data from the first backbone router to a backbone network using a backbone connection of the first backbone router when the backbone connection is operational;

detecting a failure of the backbone connection after routing of the first data;

automatically reconfiguring the first backbone router to function as a field router that does not route data using the backbone connection;

establishing an alternate path between the first backbone router and a second backbone router, the alternate path based on whether the first backbone router is within wireless range of the second backbone router;

receiving second data transmitted wirelessly to the first backbone router; and wirelessly routing the second data along the alternate path from the first backbone router to the second backbone router without using the backbone connection;

wherein the computer readable program code for establishing the alternate path comprises computer readable program code for, when the first backbone router is not within wireless range of the second backbone router:

if a neighboring field router within wireless range of the first backbone router is line powered, assigning to the first backbone router a first transmit link and a receive link that occur in specified time slots, the first transmit link and the receive link known to the neighboring field router; and if the neighboring field router within wireless range of the first backbone router is locally powered, assigning a second transmit link to the first backbone router, the second transmit link known to the neighboring field router; and wherein the computer readable program code for wirelessly routing the second data is configured to wirelessly route the second data to the neighboring field router using one of the first and second transmit links for delivery to the second backbone router.

15. The computer readable medium of claim 14, wherein the computer readable program code for establishing the alternate path further comprises computer readable program code for, when the first backbone router is within wireless range of the second backbone router:

assigning the second backbone router as a data link layer neighbor of the first backbone router; and assigning to the first backbone router a third transmit link and a second receive link that occur in specified time slots, the third transmit link and the second receive link known to the second backbone router.

16. The computer readable medium of claim 14, wherein the computer readable program code for wirelessly routing the second data comprises computer readable program code for:

using source routing at a data link layer of the first backbone router such that a source route is included in the second data routed over the alternate path from the first backbone router.

17. The computer readable medium of claim 14, wherein the computer program further comprises computer readable program code for:

initiating transmission of a message identifying the failed backbone connection from the first backbone router over the alternate path.

18. The computer readable medium of claim 14, wherein the computer program further comprises computer readable program code for:

detecting restoration of the backbone connection; and reconfiguring the first backbone router to route additional data to the backbone network over the restored backbone connection.

19. The computer readable medium of claim 14, wherein:

the first backbone router comprises a wireless physical layer, data link layer, and network layer and a backbone physical layer, data link layer, network layer, and transport layer;

the computer readable program code for routing the first data from the first backbone router to the backbone network comprises computer readable program code for routing the first data from the wireless network layer through the backbone transport, network, data link, and physical layers; and the computer readable program code for automatically reconfiguring the first backbone router and for wirelessly routing the second data along the alternate path comprise computer readable program code for causing the first backbone router to route the second data through the wireless data link and physical layers for wireless transmission over the alternate path.

20. The computer readable medium of claim 14, wherein the computer program further comprises computer readable program code for:

adjusting at least one of a quality of service parameter and a communication path in the wireless network at the first backbone router after the first backbone router has been reconfigured as the field router.

* * * * *